United States Patent
Li et al.

(10) Patent No.: US 8,810,173 B2
(45) Date of Patent: Aug. 19, 2014

(54) ROTATING MACHINERY CONDITION MONITORING USING POSITION SENSOR

(75) Inventors: Linglai Li, Shanghai (CN); Wei Qian, Shanghai (CN); Thomas D. Lundell, Lakeville, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 603 days.

(21) Appl. No.: 12/948,951

(22) Filed: Nov. 18, 2010

(65) Prior Publication Data

US 2012/0126738 A1 May 24, 2012

(51) Int. Cl.
*H02P 6/16* (2006.01)

(52) U.S. Cl.
USPC ........ 318/400.12; 318/437; 318/489; 702/76; 702/185; 73/659

(58) Field of Classification Search
CPC ............ H02P 6/085; H02P 6/14; H02P 6/06; H02P 6/10; H02P 23/0077; H02P 27/026; H02P 21/146; H02P 23/0045; H02P 27/02; H02P 21/0035; H02P 27/04; H02P 27/06; H02P 23/08; H02P 27/08; H02P 6/182; H02P 6/142; H02P 23/0081; H02P 27/16; G01R 19/0092; G01R 31/42; H02M 5/458; H02M 7/003; Y02T 10/643; B60L 15/025; G01P 3/489; G01P 3/44; G01P 13/045; G01P 3/48; F02D 41/0097; G01C 21/16; G01D 5/145; G01D 5/24409; B62D 15/02; G01B 21/22
USPC .......... 318/490, 400.21, 400.37, 603, 400.39, 318/432, 661, 648, 685, 400.12, 437, 799; 180/402; 324/163; 703/8; 700/31, 74; 702/35, 33, 36, 44, 54, 56, 185, 179, 702/121, 14, 76, 77; 340/517, 664; 73/862, 73/326

See application file for complete search history.

(56) References Cited

U.S. PATENT DOCUMENTS

| | | | | |
|---|---|---|---|---|
| 4,426,641 A * | 1/1984 | Kurihara et al. | ............. | 340/683 |
| 4,912,661 A | 3/1990 | Potter | | |
| 5,309,379 A * | 5/1994 | Rawlings et al. | ................ | 703/8 |
| 5,469,032 A * | 11/1995 | Otake | ........................ | 318/400.21 |
| 6,191,550 B1 * | 2/2001 | Yoshihara | ...................... | 318/661 |
| 6,351,723 B1 * | 2/2002 | Maekawa | ...................... | 702/185 |
| 6,388,416 B1 * | 5/2002 | Nakatani et al. | ............. | 318/700 |
| 6,477,472 B2 * | 11/2002 | Qian et al. | ...................... | 702/35 |
| 6,507,804 B1 * | 1/2003 | Hala et al. | ...................... | 702/182 |
| 6,810,341 B2 * | 10/2004 | Qian et al. | ...................... | 702/75 |
| 7,154,404 B2 * | 12/2006 | Sato | ....................... | 318/400.21 |
| 2006/0288800 A1* | 12/2006 | Mukai et al. | ............. | 73/862.326 |

* cited by examiner

*Primary Examiner* — Shawki S Ismail
*Assistant Examiner* — Jorge L Carrasquillo
(74) *Attorney, Agent, or Firm* — Boyle Fredrickson, S.C.

(57) ABSTRACT

Continuous monitoring and fault diagnosis of rotating machinery during variable speed operation is performed using only a position feedback signal. The position sensor generates a periodic waveform having multiple pulses per revolution of the machine. A circuit is included to detect, for example, a zero crossing or edge of the periodic waveform. At each detected zero crossing or edge, the time and position of the event is stored in memory. Other data, such as the current in the motor, may also be sampled and stored in memory. Because the sampled data is triggered by repeated feature of the position feedback signal, the sampled data is in a stationary reference frame in the position domain. Frequency analysis is performed on the sampled data, and the frequency components present in either the sampled signal are analyzed to identify the presence of a fault in the rotating machinery.

20 Claims, 3 Drawing Sheets

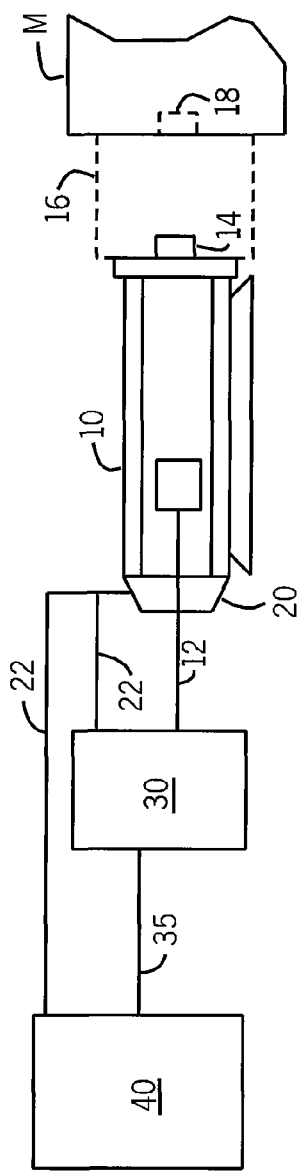
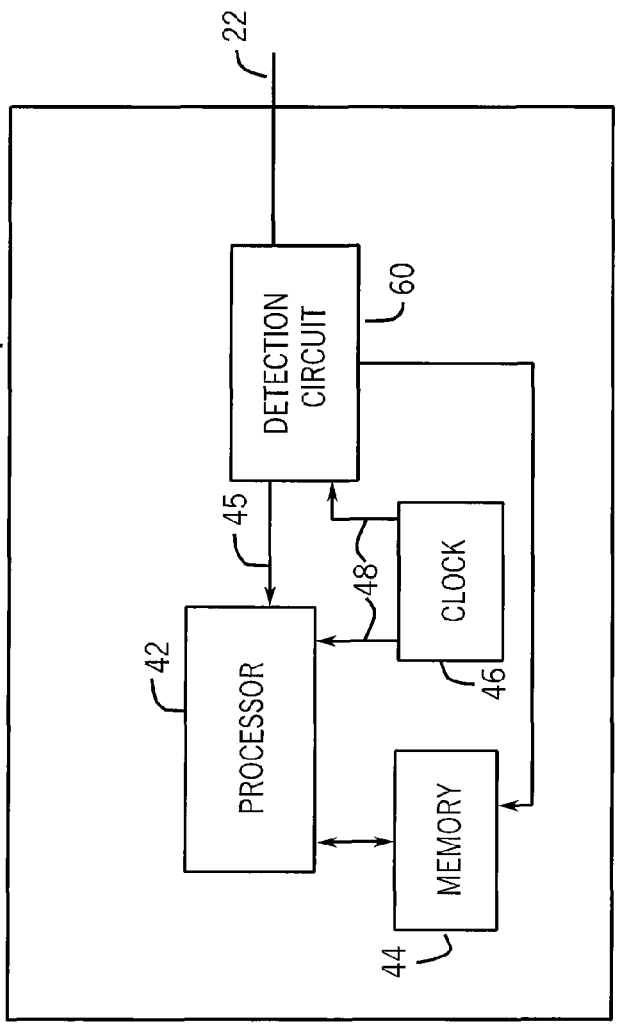

ROTATING MACHINERY CONDITION MONITORING USING POSITION SENSOR

BACKGROUND OF THE INVENTION

The subject matter disclosed herein relates to monitoring the condition of rotating machinery, such as electric motors, and, more specifically, to monitoring the condition of rotating machinery during operation at either constant or variable speed using a position sensor.

Because a rotating machine repeatedly travels over a closed, rotational path, the machine will repeatedly encounter any problem that develops in that path. For example, if a portion of a bearing in a motor becomes worn, the rotor will repeatedly travel over the worn surface. Many such conditions establish undesirable vibrations in the rotating machine. The vibrations may, in turn, accelerate failure of the worn, or another, component of the rotating machine. In addition, certain types of faults develop vibrations having unique and identifiable frequency components. Thus, it is desirable to monitor vibrations in rotating machine to monitor overall performance of the machine and to identify certain failure conditions.

Historically, it was known to mount a sensing device, such as an accelerometer, to the outside of the rotating machine. The accelerometer provides a signal corresponding to the vibrations in the machine. However, the use of accelerometers has various disadvantages. For example, vibrations may be present in one plane and not another. Consequently, it is often necessary to mount multiple accelerometers on the rotating machine to measure, for example, horizontal or vertical vibrations. In addition, the accelerometer is typically not utilized for control of the rotating machine and is, therefore, not included on the machine. Consequently, using accelerometers to monitor performance of the rotating machine typically creates an additional expense and requires on-site installation to identify problems after they arise in the field. Thus, it would be desirable to monitor vibration in the machine without requiring additional sensors.

Another challenge faced when performing vibration analysis is that the rotating machine must typically be operated at a constant speed to perform the vibration analysis. However, many rotating machines perform under variable speed operation, and it may be necessary to include a diagnostic mode of operation in the machine controller to allow constant speed operation. Thus, it would also be desirable to be able to monitor vibration in the machine under variable speed operation.

BRIEF DESCRIPTION OF THE INVENTION

The subject matter disclosed herein describes a method and apparatus which permit continuous monitoring and fault diagnosis of rotating machinery during variable speed operation using only a position feedback signal. Preferably, the position feedback signal is obtained from a position sensor which is already present on the rotating machine, for example to control operation of the rotating machine. The position sensor generates a periodic waveform having multiple periods or pulses per revolution of the machine. A circuit is included to detect, for example, a zero crossing or a rising or falling edge of the periodic waveform. At each zero crossing or edge detection, the time and position of the event may be stored in memory. Optionally, the zero crossing or edge detection may trigger sampling of other data, such as the current in the motor, which may be stored in memory. Because the data sampled is triggered by a zero crossing or edge detection of the position feedback signal, the sampled data is in a stationary reference frame in the position domain. The velocity and acceleration of the motor may be calculated from the sampled position and time information and frequency analysis performed to identify frequency components of the velocity or acceleration. Optionally, frequency analysis may be performed on one of the other sampled data signals previously stored in memory to similarly identify frequency components present in the sampled signal. The frequency components present in either the velocity, acceleration, or other sampled signal are analyzed to identify the presence of a fault in the rotating machinery.

According to one embodiment of the invention a system monitors at least one operating signal of a rotating machine having an angular position sensing device. The angular position sensing device generates a waveform representing angular position. The monitoring system includes a processor; a memory device in communication with the processor, a detection circuit configured to receive the waveform generated by the angular position sensing device and to identify a feature of the waveform that is repeated at a fixed interval of angular position during each revolution of the machine. The feature identified may be, for example, a zero-crossing or a rising or falling edge of the waveform.

The system also includes a series of instructions executable on the processor to output an indication of the condition of the rotating machine. The instructions are executable on the processor to store a plurality of values of the operating signal, each value stored responsive to identifying the feature of the waveform, identify frequency components present in the stored values of the operating signal, and generate the indication of the condition of the machine responsive to the frequency components identified.

According to another embodiment of the invention a method of monitoring the condition of a rotating machine having an angular position sensing device is disclosed. The angular position sensing device generates a waveform representative of the angular position of the rotating machine. The method detects a portion of the waveform repeated at a uniform interval of angular position during each revolution of the machine and stores a signal corresponding to the condition of the rotating machine responsive to the detection of the portion of the waveform. The frequency components present in the store signal are determined.

Thus, it is a feature of this invention that a position sensing device is utilized to trigger sampling of a signal at fixed position intervals to provide feedback of the performance of a rotating machine in a stationary reference frame in the position domain. The spectral content of the feedback information in the stationary frame is subsequently used to monitor the condition of, and detect fault conditions in, the rotating machine.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 1 is a block diagram representation of an exemplary environment for controlling a rotating machine incorporating the present invention;

FIG. 2 is a schematic representation of a controller of the present invention;

Figure 3:
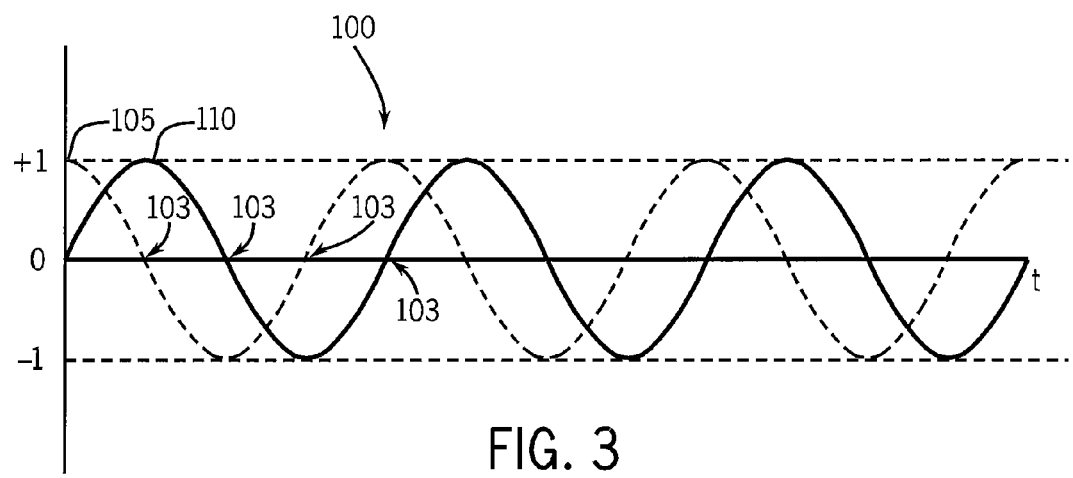
FIG. 3 is a waveform illustrating a representative sine/cosine position feedback signal.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary environment for controlling rotating machinery is illustrated. An industrial controller 40 is connected to a motor drive 30 which is controlling operation of a motor 10. The industrial controller 40 may be, but is not limited to an industrial computer or a programmable logic controller (PLC). Optionally, the industrial controller 40 may be integral to the motor drive 30. The industrial controller 40 executes a program to generate a reference signal 35 which is communicated to the motor drive 30. The reference signal 35 may be, but is not limited to, a speed or a torque command. In response to the reference signal 35, the motor drive 30 generates an output voltage 12 suitable for controlling operation of the motor 10. The voltage may be either an Alternating Current (AC) or a Direct Current (DC) voltage according to the requirements of the machine 10. Optionally, the voltage may be supplied directly from a utility input or a separate power supply (not shown). The motor 10 has a position sensor 20 which is coupled to the rotating shaft 14 of the motor 10. As the shaft 14 rotates, the position sensor 20 generates a waveform 100, shown in FIGS. 3 and 4, that is a function of the angular position of the shaft 14. The waveform 100 is transmitted by one or more electrical conductors 22 to the drive 30 and to the controller 40. The motor 10 may be used to directly drive a machine M or, optionally, a gearbox 16 may couple the shaft 14 of the rotating machine to an output shaft 18 from the gearbox through desired gears according to the requirements of the application, and the output shaft 18, in turn, drives the machine M. The connections between the motor 10, the optional gearbox 16, and the machine M may be made by any appropriate combination of gears, couplings, or bearings as would be known in the art.

Referring next to FIG. 2, an exemplary embodiment of the controller 40 includes a processor 42 in communication with a memory device 44. The processor 42 may be, but is not limited to, a dedicated microcontroller, a signal processor, or a portion of a field programmable gate array (FPGA), and although illustrated as a single device, the processor 42 may be implemented using either a single or multiple devices. Similarly, the memory device 44 is illustrated as a single device but may be implemented using either a single or multiple devices.

The controller 40 also includes a clock signal 48. The clock signal 48 is preferably generated by a clock circuit 46 incorporated within the controller 40 but, optionally, may be received as an input from a clock circuit external to the controller 40. A clock circuit 46 typically generates an analog or digital pulse stream using an oscillator having a known frequency. The clock circuit 46 may transmit the pulse stream directly to the processor 42, and the processor 42 can monitor the pulse stream and maintain a record of the number of pulses received. Because the pulses occur at a fixed frequency and, therefore, at a fixed period, a known number of pulses is readily converted to a time duration by multiplying the number of pulses by the period of the pulse stream. Optionally, the clock circuit 46 may first convert the pulse stream to a value representing either a number of pulses or a real time value and transmit the value to the processor 42. Alternately, the clock circuit 46 may be of any configuration known in the art and generate any suitable clock signal 48 which may be used to determine the length of time between events in the system.

Figure 4:
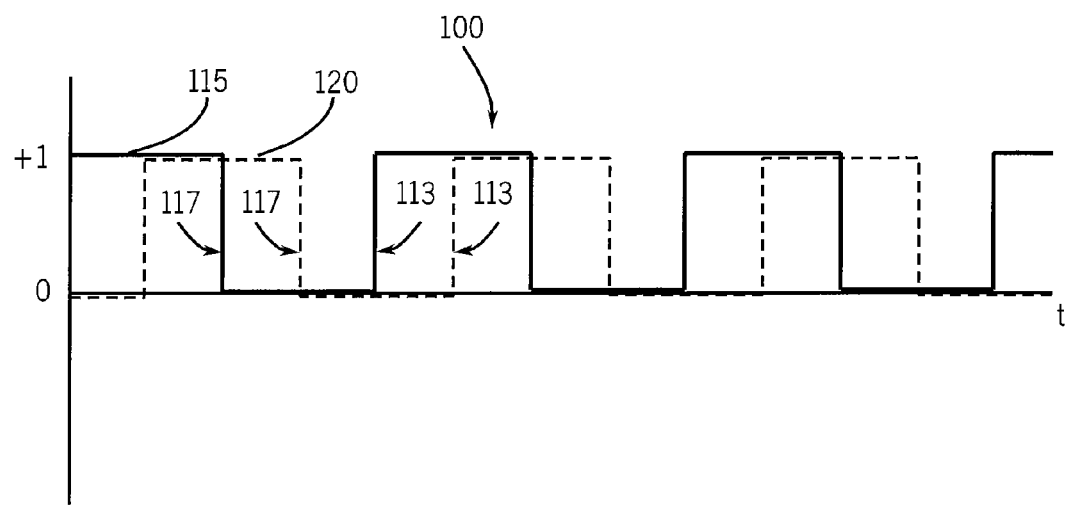
FIG. 4 is a waveform illustrating a representative a digital, quadrature position feedback signal.

A detection circuit 60 is included to identify a feature of the waveform 100 generated by the position sensor 20. Referring also to FIGS. 3 and 4, the detection circuit 60 may identify, for example, a zero-crossing 103, a rising edge 113, or falling edge 117 of the waveform 100. Many detection circuits for detecting a zero-crossing 103 or a rising or falling edge, 113 or 117 respectively, are known and any suitable circuit may be used. Optionally, the waveform 100 in FIG. 3 may offset by a DC voltage such that the magnitude of the waveform 100 transitions between zero volts and some positive voltage. The detection circuit 60 may then include a comparator to detect a voltage magnitude at the midpoint, or DC offset, of the waveform 100. It is further contemplated that the detection circuit 60 may be configured to detect still other characteristics in the waveform 100 that are repeated at uniform intervals of angular position. The detection circuit 60 generates a signal 45 responsive to detection of the desired characteristic of the waveform 100. The detection circuit 60 may also store data to memory 44 or the signal 45 may initiate the processor 42 to store data to memory 44.

It is further contemplated that the controller 40 may be integrated, in part or entirely into the motor drive 30. For example, the motor drive 30 may still receive an external reference 35; however, the waveform 100 from the position sensor 20 may be connected only to the drive 30, and the detection circuit 60 may be included in the drive 30. Further, the detection circuit 60 may interface with a processor 42, memory 44, and a clock 46 within the drive 30. Optionally, still other configurations or arrangements of the hardware may be contemplated without deviating from the scope of the invention.

Referring next to FIGS. 3 and 4, exemplary waveforms 100 generated by position sensors 20 are illustrated. It is known in the art that position sensors 20 may generate a wide range of position feedback signals. The position feedback signal may be, but is not limited to, a single channel or quadrature signal and either a digital or analog signal. The feedback signal may range from a single waveform per resolution, for example, in some resolvers, to thousands of waveforms per revolution. Each period of the waveform 100 is commonly referred to as a pulse, and, therefore, a position sensor 20 having a resolution, for example, of 1000 pulses per revolution (ppr) will generate one thousand complete sine and/or cosine waveforms for each revolution of the shaft 14 of which the position sensor 20 is detecting angular position. As illustrated in FIG. 3, an analog sinusoidal waveform 110, typically referred to as the sine feedback signal, may be generated by the position sensor 20. Optionally, a second sinusoidal waveform 105, ninety degrees out of phase with the sine signal and typically referred to as the cosine feedback signal, may also be generated. Each of the sine and cosine signals vary between a positive and negative voltage, shown here as a positive and negative one (+/−1). During one cycle of either the sine or cosine signal, the magnitude of the signal transitions from a positive voltage to a negative voltage and from a negative voltage to a positive voltage. Either of these transitions is commonly referred to as a zero crossing 103 because the magnitude of the signal crosses zero volts. It is also known that the sine and cosine signals, 105 and 110, may include a DC voltage offset (not shown) such that waveforms vary between zero volts and some positive or negative voltage. The zero crossing 103 may still be detected by either first subtracting the DC voltage offset from the sine and cosine waveform, 105 and 110, and monitoring zero crossings 103 or by comparing the sine and cosine waveform, 105 and 110, directly to the value of the DC voltage offset.

Referring next to FIG. 4, a digital quadrature waveform 100 is illustrated. A first square wave 115 alternates between a first and a second voltage level, identified as zero and one. The actual voltage levels are dependent on the voltage supplied to the position sensor 20 and may be, but are not limited to, a positive or negative five, twelve, or twenty-four volts, zero volts, or a combination thereof. A second square wave 120 is ninety degrees out of phase with the first square wave 115. The illustrated waveform 100 generates up to four potential edges for detection, namely a rising edge 113 of either the first square wave 115 or the second square wave 120 or a falling edge 117 of either the first square wave 115 or the second square wave 120. Although each edge transition is illustrated as a vertical edge, the practical constraints of physical devices yield a rapid transition over a finite duration resulting in a waveform 100 having some slope as each square wave transitions between zero and one.

As previously mentioned, fault conditions in rotating machines 10 develop vibrations having unique and identifiable frequency components. However, these vibrations often occur at a specific angular position and are a function of the speed at which the machine 10 is rotating. For example, an unbalanced load may cause a pulse on the shaft 14 of the machine 10 once per revolution while a defect in the outer ring of a bearing may cause a pulse on the shaft 14 of the machine 10 three times per revolution. If the machine 10 rotates one revolution per second, the vibration caused by the unbalanced load is one hertz and the vibration caused by the defect in the outer ring is three hertz. In comparison, if the machine 10 rotates two revolutions per second, the vibration caused by the unbalanced load is two hertz and the vibration caused by the defect in the outer ring is six hertz. Consequently, the frequency of the vibration is dependent on the speed of the motor 10 and may be used to identify the particular fault.

Figure 5:
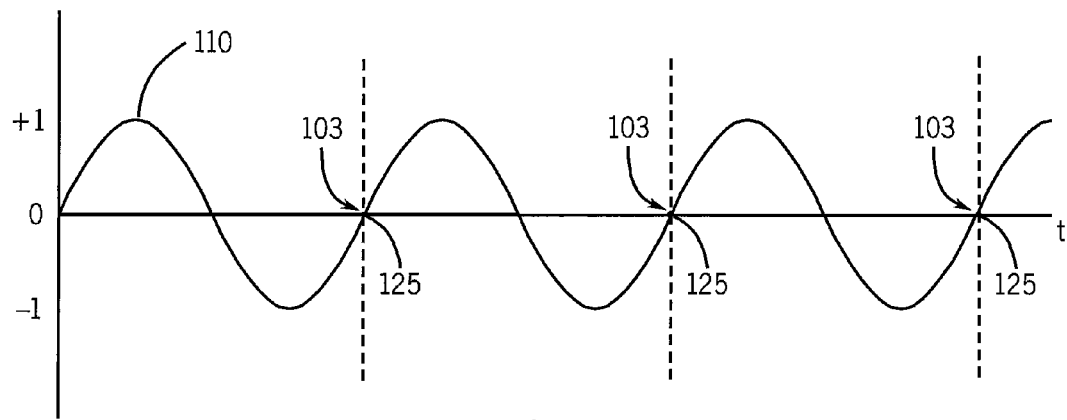
FIG. 5 is a waveform illustrating a sinusoidal position feedback signal during constant speed operation of a rotating machine.

When a rotating machine, such as the motor 10, is operating at constant speed, the rotating machine ideally travels a uniform distance during each time interval 125. Consequently, the waveform 110 may be sampled at fixed time intervals 125 to obtain data that is at uniform position intervals. The sine waveform 110 shown in FIG. 5 illustrates at least a portion of a waveform 100 generated by a motor 10 operating at a constant speed. A negative-to-positive zero-crossing 103 occurs at uniform position intervals during constant speed operation and the fixed time interval 125 is shown as corresponding to this zero-crossing.

Figure 6:
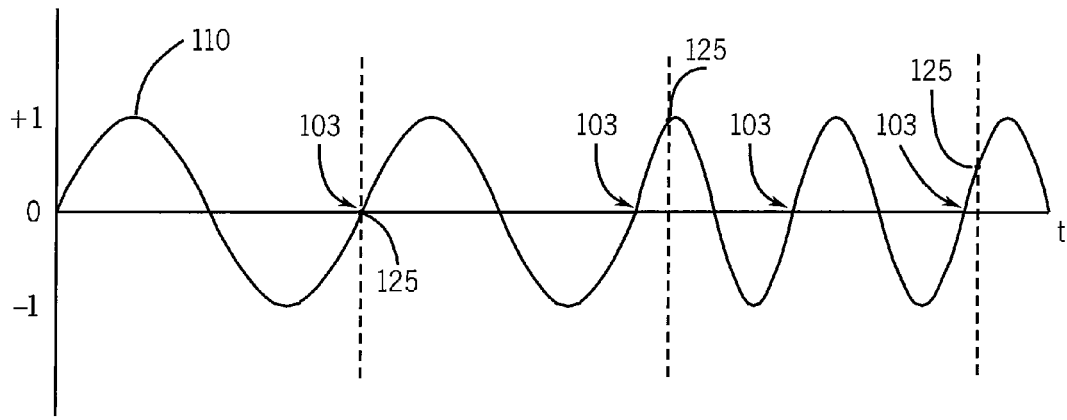
FIG. 6 is a waveform illustrating a sinusoidal position feedback signal during variable speed operation of a rotating machine.

In contrast, when a machine 10 is operating at a variable speed, the rotating machine travels a variable distance during each time interval 125. Consequently, a waveform 110 sampled at fixed time intervals 125 has no correlation to uniform position intervals. The sine waveform 110 shown in FIG. 6 again illustrates at least a portion of a waveform 100 generated by a motor 10 operating at variable speed. The fixed time interval 125 no longer corresponds to the same location on the waveform, for example the negative-to-positive zero-crossing 103, as it did in FIG. 5. Nevertheless, the zero-crossing 103 still occurs at uniform intervals of angular position.

In operation, the controller 40 permits continuous monitoring and fault diagnosis of a motor 10 during either constant or variable speed operation. The detection circuit 60 is used to identify at least one characteristic of the waveform 100 that occurs at uniform position intervals. The characteristic feature occurs at a uniform interval with respect to the angular position of the motor 10 and may be, but is not limited to, a zero-crossing 103, rising edge 113, or falling edge 117 of the waveform 100.

When the detection circuit 60 identifies the desired feature of the waveform 100, data corresponding to the operation of the motor 10 is stored for later analysis. The processor 42 may for example store an operating signal responsive to vibrations in the motor 10. Any of numerous signals utilized by the motor control algorithm, including but not limited to, a current feedback or a current reference, may be responsive to vibrations in the motor and subsequently contain suitable spectral content for fault analysis. Consequently, the detection circuit 60 generates a capture signal 45 responsive to detecting the desired feature in the waveform 100. The capture signal 45 is transmitted to the processor 42 and the processor, responsive to the capture signal 45, stores values of the desired signal in memory. Spectral analysis is subsequently performed on the stored values of the signal to identify frequencies of vibrations present in the motor 10.

Optionally, the processor 42 may store a timestamp corresponding to detection of the desired feature. Although spectral analysis may not be performed directly on the timestamp, because the desired feature in the waveform 100 occurs at uniform angular increments, the timestamp may be used calculate angular velocity or angular acceleration of the motor 10. Spectral analysis may then be performed on either the angular velocity or angular acceleration.

The expected number of pulses, or cycles of the waveform 100, per revolution of the rotating machine is determined by the position sensor 20 used. The value is typically stored in memory 44 and available to the processor 42. The incremental angular position corresponding to each pulse is then determined by dividing the total angular distance traversed per revolution, such as 360° or 2π radians, by the number of pulses per revolution, as shown in equation (1), where one complete revolution is given as 2π radians.

$$\text{Incremental angular position} = \frac{2\pi}{\text{pulses per revolution}} \quad (1)$$

Because the detected feature occurs once per cycle of the waveform and at the same location on the waveform, the incremental change in angular position between each detected feature corresponds to the increment for each pulse found in equation (1). The processor 42 then calculates the angular velocity by dividing the incremental change in angular position by the time interval between detected events, for example, as shown in equation (2).

$$\omega_{i-1} = \frac{p_i - p_{i-2}}{t_i - t_{i-2}} \quad (2)$$

where
$p_i$-$p_{i-2}$ is the change in angular position
$t_i$-$t_{i-2}$ is the change in time
$\omega_{i-1}$ is the angular velocity The processor 42 executes to calculate the angular acceleration by dividing the incremental change in angular velocity by the time interval between calculations of the angular velocity, for example, as shown in equation (3).

$$a_{i-1} = \frac{\omega_i - \omega_{i-2}}{t_i - t_{i-2}} \quad (3)$$

where
$\omega_i$-$\omega_{i-2}$ is the change in angular velocity
$t_i$-$t_{i-2}$ is the change in time
$\alpha_{i-1}$ is the angular acceleration After determining the angular velocity or acceleration, the processor 42 executes to compare the measured angular velocity or acceleration to the commanded velocity or acceleration profile. The commanded profile is determined by the motor drive 30 and may be available to the processor 42 via an external connection or via internal signals if the controller 40 is incorporated into the motor drive 30. Optionally, the commanded profile may be estimated by smoothing the angular velocity or acceleration calculated in equation (2) or (3). Subtracting the commanded profile from the measured value results in an angular velocity or acceleration signal that contains components from external disturbances on the machine including, but not limited to, vibrations caused by fault conditions.

The processor 42 then executes to perform spectral analysis on the resultant signal and to identify the frequency of the signal components present in the rotating machine. Techniques have been developed to perform this spectral analysis on data in a stationary reference frame. Data is in the stationary reference frame when it is sampled at uniform position increments. Because the angular position data sampled is triggered by a zero crossing or edge detection, the angular position data is sampled by the detection circuit 60 at uniform increments and, therefore, is in a stationary reference frame. The spectral analysis identifies the magnitude and frequency of the signal components still present in the angular velocity or angular acceleration signals after subtracting the commanded profiles. The magnitude and frequency of the signal components are stored in memory 44.

The spectral content is then used by the processor 42 to detect fault conditions in the rotating machinery. The frequency of signal components identified by spectral analysis is compared against known frequencies which indicate the presence of certain faults, including, but not limited to, bearing faults, gear faults, or a load imbalance. The known frequencies may be a function of the machine characteristics, such as operating speed or physical geometries and may be calculated by the processor 42 or obtained from a table stored in memory 44. Equations (4)-(6) provide a representative indication of some bearing faults exhibiting spectral content that is dependent on the physical characteristics of the bearing. The magnitude of the signal component indicates the relative severity of the condition with a greater magnitude indicating a higher level of vibration and, consequently, a more severe fault condition. Thus, it is desirable to monitor vibrations in a rotating machine to identify certain failure conditions of the machine.

$$F_O = \frac{1}{2} S \cdot N \cdot \left[1 - \frac{BP}{PD}\cos\beta\right] \quad (4)$$

$$F_I = \frac{1}{2} S \cdot N \cdot \left[1 + \frac{BD}{PD}\cos\beta\right] \quad (5)$$

$$F_B = S \cdot \frac{PD}{BD} \cdot \left[1 - \left(\frac{BD}{PD}\cos\beta\right)^2\right] \quad (6)$$

where:
$F_O$ is the frequency of a defect in the outer ring of a bearing
$F_I$ is the frequency of a defect in the inner ring of a bearing
$F_B$ is the frequency of a defect in the rolling element of a bearing
S is the shaft speed
N is the number of rolling elements in the bearing
BD is bore diameter of the bearing
PD is pitch diameter of the bearing
$\beta$ is the contact angle The spectral content is also used by the processor 42 to monitor the condition of the rotating machinery. As the spectral analysis is performed at each subsequent sampling interval, the magnitude and frequency of the signal components is compared against the magnitude and frequency of the signal components stored in memory 44. If the processor 42 identifies a change in the magnitude of one of the signal components that exceeds a predetermined threshold, a notification is generated. The change in magnitude of the signal component indicates a change in performance of the machine. The notification may be output to an operator to indicate maintenance is required prior to a fault condition occurring. Thus, it is also desirable to monitor vibrations in rotating machine to monitor overall performance of the machine and to identify wear in the machine and provide notice of required maintenance prior to a fault condition occurring.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:
1. A system for monitoring at least one operating signal of a rotating machine having an angular position sensing device, the angular position sensing device generating a waveform, the monitoring system comprising:
   a processor;
   a memory device in communication with the processor;
   a detection circuit configured to receive the waveform generated by the angular position sensing device, to detect a feature of the waveform that is repeated at a fixed inter- val of angular position during each revolution of the machine, and to generate a trigger each time the feature is detected; and a series of instructions executable on the processor to:

receive the trigger from the detection circuit;

store a plurality of values of the operating signal, wherein one of the plurality of values is stored responsive to receiving each trigger, defining a series of values stored at the fixed interval of angular position;

determine a spectral content of the operating signal from the series of values, wherein the spectral content identifies a plurality of components present in the operating signal and each of the plurality of components has a magnitude and a frequency;

identify at least one of the plurality of components present in the spectral content of the operating signal as a function of the frequency; and generate an indication of the condition of the rotating machine responsive to the identified component.

2. The system of claim 1 wherein the operating signal stored is a value representing elapsed time and the instructions are further executable to determine at least one of an angular speed and an angular acceleration of the machine as a function of the fixed interval and the stored values representing elapsed time.

3. The system of claim 1 wherein the rotating machine is controlled by a motor drive and the operating signal is an internal control signal of the motor drive.

4. The system of claim 1 wherein the operating signal is a value generated by an external sensor monitoring operation of the rotating machine.

5. The monitoring system of claim 1 wherein the feature of the waveform identified by the detection circuit is a transition across zero volts.

6. The monitoring system of claim 1 wherein the feature of the waveform identified by the detection circuit is a change between a first voltage level and a second voltage level.

7. The monitoring system of claim 1 wherein the indication of the condition of the machine identifies one of a bearing fault, a gear fault, a load imbalance, and a shaft misalignment.

8. The monitoring system of claim 1 wherein the series of instructions are further executable to periodically store the magnitude of at least one of the plurality of components and compare the magnitude of a most recent component to the magnitude of a previously stored component.

9. The monitoring system of claim 8 wherein a notification is generated when a difference in the magnitude between the most recent component and the magnitude of one of the previously stored components exceeds a predetermined threshold.

10. A controller for an electric motor having an angular position sensing device, the angular position sensing device generating a waveform, the controller including:

a clock circuit generating a clock signal;

a detection circuit receiving the waveform from the angular position sensing device and detecting a feature of the waveform repeated at a uniform interval of angular position during each revolution of the motor;

a memory device storing a plurality of instructions; and a processor configured to executed the instructions to:

control the electric motor;

generate at least one internal signal responsive to controlling the electric motor;

store a value of the internal signal in the memory device each time the detection circuit detects the feature of the waveform; and determine the spectral content of the internal signal as a function of the stored values of the internal signal wherein the spectral content identifies a plurality of components present in the operating signal and each of the plurality of components has a magnitude and a frequency.

11. The controller of claim 10 wherein the feature of the waveform identified by the detection circuit is one of a zero crossing and a change between a first voltage level and a second voltage level.

12. The controller of claim 11 wherein a fault condition in one of the motor and a machine driven by the motor is identified responsive to the spectral content of the internal signal.

13. The controller of claim 12 wherein the internal signal stored is one of an angular speed and an angular acceleration of the machine as a function of the uniform interval and the clock signal.

14. The controller of claim 11 wherein the series of instructions are further executable to periodically store a magnitude of at least one of the plurality of components, compare the magnitude of a most recent component to the magnitude of a previously stored component, and generate a notification when a difference in the magnitude between the most recent component and one of the previously stored components exceeds a predetermined threshold.

15. A method of monitoring a condition of a rotating machine having an angular position sensing device, the angular position sensing device generating a waveform, the steps comprising:

detecting a portion of the waveform repeated at a uniform interval of angular position during each revolution of the machine;

storing a signal corresponding to the condition of the rotating machine responsive to the detection of the portion of the waveform to generate a series of values stored at the uniform interval of angular position;

determining a spectral content of the signal wherein the spectral content identifies a plurality of components present in the operating signal and each of the plurality of components has a magnitude and a frequency; and determining the condition of the rotating machine responsive to the frequency of the components present in the spectral content.

16. The method of claim 15 wherein the stored signal is a one of a velocity or acceleration of the rotating machine.

17. The method of claim 15 wherein the portion of the waveform detected is a zero-crossing.

18. The method of claim 15 wherein the portion of the waveform detected is one of a rising or a falling edge.

19. The method of claim 15 further comprising the step of identifying a fault condition corresponding to the frequency of at least one of the components.

20. The method of claim 15 further comprising the steps of:

storing the magnitude and the frequency of at least one of the components at a periodic interval; and generating a notification when the magnitude of one of the components reaches a predetermined threshold.

* * * * *